United States Patent
Li et al.

(10) Patent No.: US 7,858,734 B2
(45) Date of Patent: Dec. 28, 2010

(54) POLYIMIDE MATERIAL AND PREPARATION METHOD THEREOF

(75) Inventors: Qiang Li, Shenzhen (CN); Chengzhang Li, Shenzhen (CN); Lin Jiang, Shenzhen (CN)

(73) Assignee: BYD Co., Ltd., Shenzhen (CN)

(*) Notice: Subject to any disclaimer, the term of this patent is extended or adjusted under 35 U.S.C. 154(b) by 319 days.

(21) Appl. No.: 12/186,301

(22) Filed: Aug. 5, 2008

(65) Prior Publication Data

US 2009/0143521 A1 Jun. 4, 2009

(30) Foreign Application Priority Data

Nov. 29, 2007 (CN) .................... 2007 1 0196580

(51) Int. Cl.
| | |
|---|---|
| C08G 69/26 | (2006.01) |
| C08G 69/08 | (2006.01) |
| C08G 73/10 | (2006.01) |
| C08G 69/28 | (2006.01) |
| C08K 3/18 | (2006.01) |
| C08K 3/22 | (2006.01) |
| C08K 3/10 | (2006.01) |
| C08K 9/04 | (2006.01) |
| C08K 3/34 | (2006.01) |
| C04B 26/06 | (2006.01) |
| H01B 1/22 | (2006.01) |

(52) U.S. Cl. .............. 528/353; 528/310; 528/350; 528/351; 524/430; 524/437; 524/445; 524/449

(58) Field of Classification Search .............. 528/310, 528/351, 353; 525/435, 436
See application file for complete search history.

(56) References Cited

U.S. PATENT DOCUMENTS

| | | | | | |
|---|---|---|---|---|---|
| 3,528,950 | A | * | 9/1970 | Lubowitz | 528/229 |
| 3,745,149 | A | * | 7/1973 | Serafini et al. | 528/288 |
| 4,937,316 | A | * | 6/1990 | Ohta et al. | 528/353 |
| 5,171,828 | A | * | 12/1992 | Meterko et al. | 528/353 |
| 5,175,241 | A | * | 12/1992 | Darrow | 528/353 |
| 6,642,393 | B2 | * | 11/2003 | Okada et al. | 549/242 |
| 6,777,525 | B2 | * | 8/2004 | Pater | 528/170 |
| 2008/0274292 | A1 | * | 11/2008 | Shooshtari et al. | 427/389.8 |

FOREIGN PATENT DOCUMENTS

| | | |
|---|---|---|
| CN | 01118566 X | 10/2003 |
| CN | 03127181.2 | 9/2004 |
| CN | 200510011871.4 | 11/2005 |
| WO | WO 2009067864 | * 6/2009 |

OTHER PUBLICATIONS

Yang, S.Y., Park, C.E., Jung, M.S. Polymer, vol. 44, p. 3243-3249, 2003.*

* cited by examiner

Primary Examiner—Vasu Jagannathan
Assistant Examiner—Anthony H Sheh
(74) Attorney, Agent, or Firm—Brinks Hofer Gilson & Lione

(57) ABSTRACT

A polyimide material comprises a polyimide. The polyimide has repeating units of formula (I). The polyimide material further comprises a coupling agent-containing filler.

A method for preparing a polyimide material comprises allowing a mixture comprising an aromatic tetracarboxylic dianhydride, an aromatic diamine, and a coupling agent-containing filler to react to produce a polyamic acid. The method further comprises contacting the polyamic acid with an aliphatic dicarboxylic acid of formula (II) to produce an intermediate, and imidizing the intermediate to produce the polyimide material.

A polyimide comprises repeating units of formula (I).

36 Claims, No Drawings

POLYIMIDE MATERIAL AND PREPARATION METHOD THEREOF

The present application claims priority to Chinese Patent Application No. CN200710196580.6, filed Nov. 29, 2007, the entirety of which is hereby incorporated by reference.

FIELD OF THE DISCLOSURE

The present disclosure relates to polyimide materials and preparation methods thereof.

BACKGROUND OF THE DISCLOSURE

Since Dupont (USA) invented aromatic polyimide compounds in 1955, various polyimide films and products with different structures and properties have been developed. Owning to advantages such as good mechanical properties, electrical properties, and resistance to radiation and heat, polyimides have found broad applications in the fields of aerospace, electronics, automobile, and telecommunication, etc. Nevertheless, the molecular structure of polyimides makes them poorly meltable and poorly dissolvable, which causes great inconvenience for their practical applications. Thus modification of polyimides becomes hot spots, intensively studied by scientists worldwide. In fact, scientists have made great achievements. For example, Dupont (USA) developed Kapton films in 1962, which are synthesized through a condensation reaction between a pyromellitic dianhydride and a triphenyl diether diamine, have heat resistance close to the limit, and have good performance to price ratio. The Kapton films are still the dominant product among various heat-resistant resins until now, and have wide applications in the fields of military, aerospace, electronics, electrical appliance, and automobile. In the 1980s, Ube Industries (Japan) synthesized high performance full-aromatic polyimides from 3,3',4,4'-biphenyltetracarboxylic dianhydride and 4,4'-oxydianiline. Products prepared from these polyimides, such as polyimide films Upilex-R and Upilex-S, especially Upilex-S, have higher rigidity and mechanical strength, low shrinkage ratio, low thermal expansion coefficient, and much lower water permeability and gas permeability. More significantly, their hydrolysis stability is much higher than Kapton films. Therefore, they exhibit tremendous value in the microelectronic field, and become the most noticeably competitive products. Other examples include Apical PI films developed by Kaneka corporation (Japan), Ultem polyether imide (PEI) plastic developed by GE(USA), and Torlon poly(amide imide) (PAI) developed by Amoco.

Until now, polyimide compounds with various performance characteristics are available in the polyimide market. However, as technology is being developed toward higher end and refined applications, more challenging, demanding, and comprehensive performance requirements have to be met by polyimides used in the field of aerospace, microelectronics, electronics, electrical appliance, and automobile, such as higher peel strength and tear strength, good flexibility, and high glass transition temperature. Until now reports related to that type of polyimides are rare in both the Chinese domestic and international markets.

CN 1529546A discloses a preparation method of cover films used in flexible printed circuit board. The method comprises preparing a 25% chloroform solution from EX-48 brominated epoxy resin (20-30 parts), E-12 bisphenol-A epoxy resin (16-20 parts), F-44 phenolic epoxy resin (8-12 parts), Hytrel thermoplastic elastomer (14-29 parts), a thermoplastic carboxylated acrylonitrile-butadiene rubber (8-14 parts), an arylamine curing agent (diamino diphenyl methane) (4 parts), and a modified dicyanodiamide (8 parts). The method further comprises coating the 25% chloroform solution onto a polyimide film, drying the polyimide film at 80-90° C. for 15 minutes to form a 15-20 microns coat, and isolating the coat by using polyester or release paper to produce the cover film.

CN 1123589C discloses a thermosetting polyimide base resin, which is prepared from an aromatic tetracarboxylic dianhydride (100 weight parts), an aromatic diamine (35-110 weight parts), and a reactive aliphatic dicarboxylic acid (10-55 weight parts). The reactive aliphatic dicarboxylic acid is an organic compound with the following chemical structure:

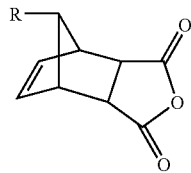

wherein R is H, methyl, or ethyl. The resin can be used at 310-320° C. for a long period of time. Compared with PMR-15, the cured material has excellent anti-shock performance characteristics. The carbon fiber-reinforced resin-based composite material prepared from the same has significantly reduced microcracking in high temperature applications.

CN 1693338A discloses a multi-block copolymerized polyimide, with the following chemical structure:

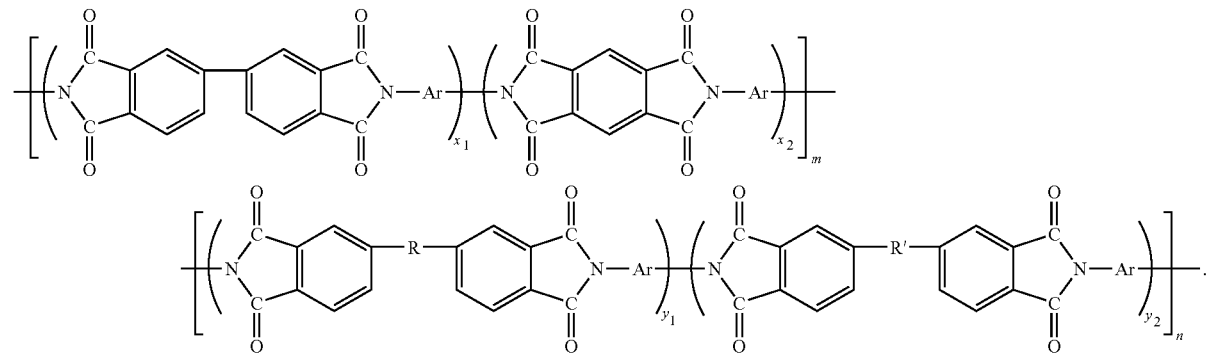

Its preparation method comprises (1) dissolving an aromatic diamine in N,N-dimethyl acetylamide (DMAc); (2) adding an aromatic dianhydride at a certain ratio while stirring to allow the aromatic diamine and the aromatic dianhydride to react at 0-25° C. for 4-6 hours to produce an amino- or anhydride-terminated oligomer solution; (3) further sequentially adding other dianhydride(s) and diamine(s) to allow the same to fully react for 6-8 hours to provide a copolymer with a block structure; (4) preparing the copolymerized polyimide powder or film from the copolymer by chemical imidization or thermal imidization; wherein the aromatic dianhydride is 3,3',4,4'-biphenyltetracarboxylic dianhydride and pyromellitic dianhydride; the aromatic diamine is one or more of 4,4'-oxydianiline and bisphenol-A diamine; the other dianhydride can be one or more of 4,4'-carbonyldiphthalic anhydride, 4,4'-oxydiphthalic anhydride, bisphenol A dianhydride, 1,4-bis(3,4-dicarboxyphenoxy)benzene dianhydride, and 2,2-bis(3,4-dicarboxyphenyl)hexafluoropropane dianhydride; the other diamine can be one or more of benzophenone diamine, phenylene diamine, 1,3-bis(4-aminophenoxy)benzene (1,3,4-APB), 1,4-bis(4-aminophenoxy)benzene(1,4,4-APB), and 2,2-bis[4-(3-aminophenoxy)phenyl]hexafluoropropane. The multi-block copolymerized polyimide has good heat resistance and mechanical properties, whose rigidity and processability can be adjusted by regulating the composition of the multi-block copolymerized polyimide.

Although the aforementioned polyimide materials are good in certain performance, they do not simultaneously have good peel strength, tear strength, and flexibility, and high glass transition temperature. As technology is being developed toward higher end and refined applications, more challenging, demanding, and comprehensive performance requirements have to be met by polyimides used in the field of aerospace, microelectronics, electronics, electrical appliance, and automobile. Polyimide materials are required to have high peel strength and tear strength, good flexibility, and high glass transition temperature simultaneously.

SUMMARY OF THE DISCLOSURE

In one aspect, a polyimide material comprises a polyimide. The polyimide has repeating units of formula (I):

wherein $Ar^1$ and $Ar^2$ are each independently an aryl containing at least one benzene ring, the value of k allows the intrinsic viscosity of a polyamic acid corresponding to the polyimide to be about 100-300 mL/g, $R^1$, $R^2$ and $R^3$ are independently one or more of —H, alkyl, carboxyl, cyano, amino, and alkylamino, R' and R" are independently alkylene or alkylidene, each m is independently an integer of about 0-64, each n is independently an integer of about 0-45, provided that m+n>0. The polyimide material further comprises a coupling agent-containing filler.

In another aspect, a method for preparing a polyimide material comprises allowing a mixture comprising an aromatic tetracarboxylic dianhydride, an aromatic diamine, and a coupling agent-containing filler to react to produce a polyamic acid. The method further comprises contacting the polyamic acid with an aliphatic dicarboxylic acid of formula (II) to produce an intermediate:

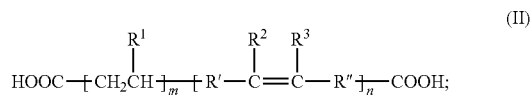

wherein $R^1$, $R^2$ and $R^3$ are independently one or more of —H, alkyl, carboxyl, cyano, amino, or alkylamino, R' and R" are independently alkylene or alkylidene, each m is independently an integer of about 0-64, each n is independently an integer of about 0-45, provided that m+n>0; and the intrinsic viscosity of the polyamic acid is about 100-300 mL/g. The method also comprises imidizing the intermediate to produce the polyimide material.

In further another aspect, a polyimide comprises repeating units of formula (I):

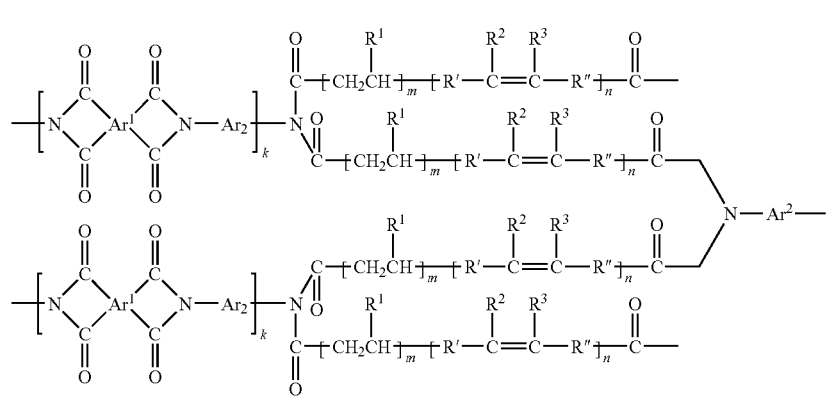

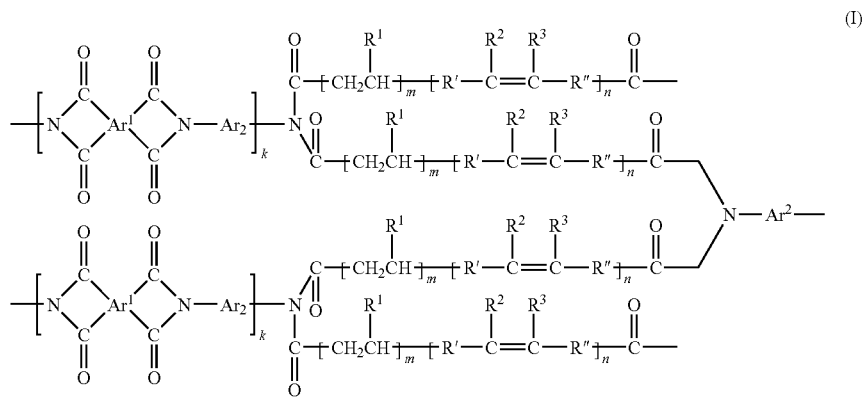

(I)

wherein $Ar^1$ and $Ar^2$ are each independently an aryl containing at least one benzene ring, the value of k allows the intrinsic viscosity of a polyamic acid corresponding to the polyimide to be about 100-300 mL/g, $R^1$, $R^2$ and $R^3$ are independently one or more of —H, alkyl, carboxyl, cyano, amino, and alkylamino, R' and R" are independently alkylene or alkylidene, each m is independently an integer of about 0-64, each n is independently an integer of about 0-45, provided that m+n>0. The polyimide material further comprises a coupling agent-containing filler.

DETAILED DESCRIPTION OF THE DISCLOSURE

A small amount of a coupling agent-containing filler and an aliphatic dicarboxylic acid is sufficient to prepare the polyimide materials according to the present disclosure. Preferably, the content of the coupling agent-containing filler is about 0.1-40 wt %, and the content of the polyimide is about 60-99.9 wt % based on total weight of the polyimide material. More preferably, the content of the coupling agent-containing filler is about 5-30 wt %, and the content of the polyimide is about 70-95 wt % based on total weight of the polyimide materials.

As polyimide (PI) is an insoluble polymer, its degree of polymerization (k) can be hardly accurately tested. Another physical parameter directly related to the degree of polymerization is the intrinsic viscosity of polyamic acid. The polyamic acid is an intermediate during polyimide preparation by reacting a tetracarboxylic dianhydride with a diamine. Studies show that polyimides with required degree of polymerization or physical properties can be obtained by controlling the intrinsic viscosity of the polyamic acid within a certain range. The intrinsic viscosity is a physical parameter related to the polymer's relative molecular weight but unrelated to testing conditions such as concentrations. The intrinsic viscosity represents single molecule contribution to the solution viscosity, and can objectively reflect the degree of polymerization of polyamic acid. Therefore, the intrinsic viscosity of polyamic acid is usually adopted for representing the degree of polymerization of polyamic acid, and thus reflects the degree of polymerization of polyimide. The present disclosure adopts the aforementioned method to characterize the degree of polymerization of polyimide in the polyimide material. The intrinsic viscosity of polyamic acid corresponding to the polyimide is controlled within about 100-300 mL/g, preferably about 140-260 mL/g. Thus, the value of k should allow the intrinsic viscosity of polyamic acid corresponding to the polyimide within about 100-300 mL/g, preferably about 140-260 mL/g.

For the polyimide materials, all aliphatic dicarboxylic acids satisfying the structural formula (II) can be used. Preferably, $R^1$, $R^2$ and $R^3$ are independently selected from the group consisting of —H, —CN, —CH$_3$, —CH(CH$_3$)$_2$, —COOH, and —N(CH$_3$)$_2$. R' and R" are independently —CH$_2$— or —C$_2$H$_4$—. m is an integer of about 5-30. n is an integer of about 5-40. The value of k makes the intrinsic viscosity of the polyamic acid corresponding to the polyimide be about 140-260 mL/g. More preferably, $R^1$, $R^2$ and $R^3$ are all —H. R' and R" are independently —CH$_2$—. Each m is independently an integer of about 5-25. Each n is independently an integer of about 5-25.

The alkyl can be either linear or branched $C_{1-20}$ alkyl. The alkylamino can be monoalkylamino and/or dialkylamino, in which the alkyl can be either linear or branched $C_{1-20}$ alkyl; the alkylene or alkylidene can be $C_{1-20}$ alkylene or alkylidene.

For the polyimide materials according to the present disclosure, the coupling agent-containing filler can be one or more of a coupling agent-containing mica powder, a coupling agent-containing inorganic clay, a coupling agent-containing alumina, and a coupling agent-containing talc powder. The particle diameter of the coupling agent-containing filler is determined according to any specific applications. Generally, when the polyimide materials are used as films, the coupling agent-containing filler preferably has particle diameter no more than about 15 microns, and preferably no more than about 12 microns, e.g. about 5-12 microns. Preferably, in the coupling agent-containing filler, the coupling agent content is about 0.5-8 wt %. The coupling agents can be various coupling agents well-known by those skilled in the arts, such as silane coupling agents and/or titanate coupling agents. For example, the silane coupling agent can be (3-aminopropyl) triethoxysilane (with commercial name KH550), (3-glycidoxypropyl)trimethoxysilane (with commercial name KH570), (3-chloropropyl)trimethoxysilane (with commercial name A-143), 3-methacryloxypropyltrimethoxysilane (with commercial name A187, KH-560), vinyltriethoxysilane (with commercial name A151), vinyltrimethoxysilane (with commercial name A171). For example, the titanate coupling agent can be isopropyl tri(N-ethylamino-ethylamino)titanate (with commercial name KB-44) and isopropyl tri(dioctylpyrophosphate) titanate (with commercial name KR-38S).

The coupling agent-containing filler satisfying the above conditions can be commercially purchased, or prepared according to various methods well-known for those skilled in the arts, such as by a spray dispersing method. The spray dispersing method comprises diluting a coupling agent (about 1.5-2.5 weight parts) with substantially equal volume of industrial ethanol, adding acetic acid (equal to about 25-30 wt % of weight of the coupling agent), spraying the obtained solution onto about 100 weight parts of a filler, mixing the solution and the filler, and drying the mixture at about 100-140° C.

$Ar^1$ and $Ar^2$ comprise at least one benzene ring. Preferably, $Ar^1$ is one or more of groups with the structures below:

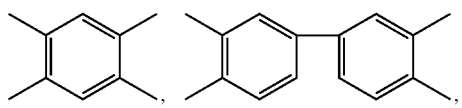

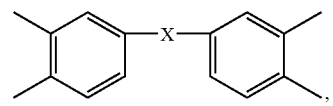

wherein X is selected from one or more of the following divalent groups: —CO—, —O—, —S—, —SO$_2$—, —CH$_2$—, —C(CH$_3$)$_2$— and —C(CF$_3$)$_2$—;

$Ar^2$ is one or more of groups with the following structures:

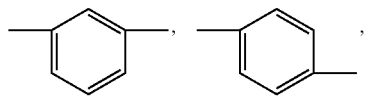

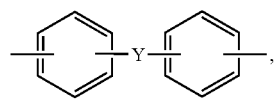

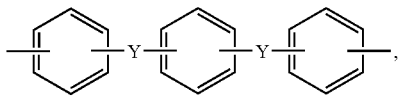

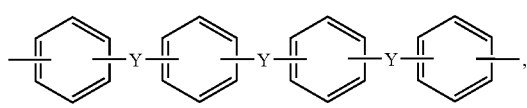

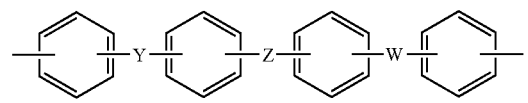

wherein Y, Z, and W are independently selected from one or more of —CO—, —O—, —S—, —SO$_2$—, —CH$_2$—, —C(CH$_3$)$_2$— and —C(CF$_3$)$_2$—. More preferably $Ar^1$ is one or two of groups with the following structures:

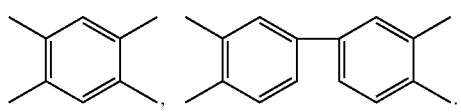

$Ar^2$ is one or more of groups with the following structures:

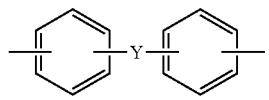

wherein Y is one of —CO—, —O— and —CH$_2$—.

For the polyimide materials provided by the present disclosure, the carboxyl of the aliphatic dicarboxylic acid reacts with the terminal amino group of polyimide at high temperature of imidization condition to further form an imide structure. The carboxyls of two adjacent aliphatic dicarboxylic acids bond with each other through at most one imide bond, thus forming a non-close-type cross-linked structure as shown in formula (I) below:

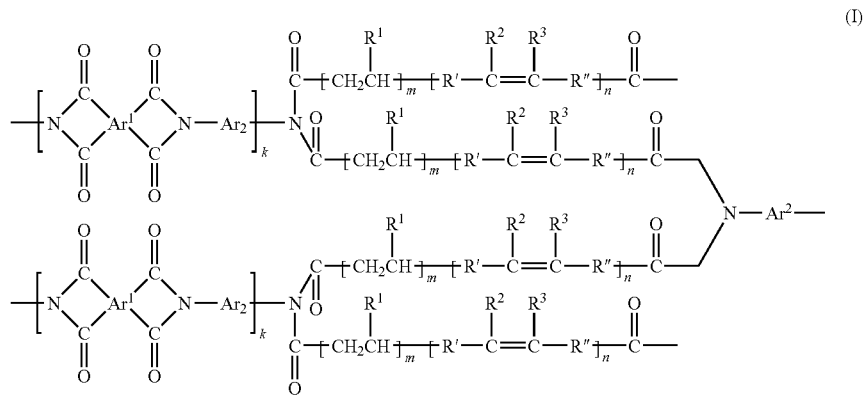

In formula (I), the tert-nitrogen terminal groups (N—) of the polyimide all bond with the carboxyl of the aliphatic dicarboxylic acid, and the carboxyl groups of the aliphatic dicarboxylic acid all bond with the tert-nitrogen terminal groups (N—) of the polyimide. The values of m and n are respectively equal to those of m and n in the aliphatic dicarboxylic acid raw material. Therefore, the values of m and n can be deducted from the raw material used.

The present disclosure also provides a method for preparing polyimide materials. The method comprises allowing a mixture comprising an aromatic tetracarboxylic dianhydride, an aromatic diamine, and a coupling agent-containing filler to react in a solvent to produce a polyamic acid, contacting the polyamic acid with an aliphatic dicarboxylic acid of formula (II) to produce an intermediate:

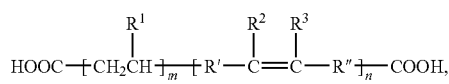
(II)

wherein $R^1$, $R^2$ and $R^3$ are independently one or more of —H, alkyl, carboxyl, cyano, amino, and alkylamino; R' and R" are independently alkylene or alkylidene; each m is independently an integer of about 0-64, each n is independently an integer of about 0-45, provided m+n>0; and the intrinsic viscosity of the polyamic acid is about 100-300 mL/g; and imidizing the intermediate. Preferably, $R^1$, $R^2$ and $R^3$ are independently one or more of —H, —CN, —CH$_3$, —CH(CH$_3$)$_2$, —COOH, —N(CH$_3$)$_2$; R' and R" are independently —CH$_2$— or —C$_2$H$_4$—; each m is independently an integer of about 5-30, each n is independently an integer of about 5-40, and the intrinsic viscosity of the polyamic acid is about 140-260 mL/g. A small amount of coupling agent-containing filler and aliphatic dicarboxylic acid is sufficient. Preferably, based on the total weight of the aromatic tetracarboxylic dianhydride, the aromatic diamine, the coupling agent-containing filler, and the aliphatic dicarboxylic acid, the content of the coupling agent-containing filler is about 0.1-40 wt %, more preferably about 5-30 wt %. The polyamic acid is added at the amount of about 60-99 wt %, preferably about 70-90 wt %. The aliphatic dicarboxylic acid is added at the amount of about 0.1-20 wt %, preferably about 1-20 wt %. The molar ratio of the aromatic tetracarboxylic dianhydride and the aromatic diamine is about 0.8-1.2:1, preferably about 0.95-1.05:1. The obtained polyimide has improved peel strength, tear strength, and flexibility.

According to the preparation method of polyimide material provided by the present disclosure, the aromatic tetracarboxylic dianhydride can be one or more of the following aromatic tetracarboxylic dianhydrides:

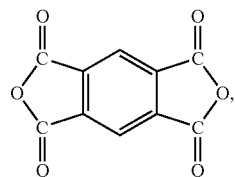

-continued

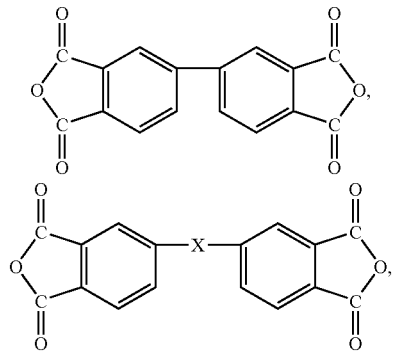

wherein X is selected from one of the following divalent groups: —CO—, —O—, —S—, —SO$_2$—, —CH$_2$—, —C(CH$_3$)$_2$— and —C(CF$_3$)$_2$—. The aromatic diamine can be one or more of the following aromatic diamine:

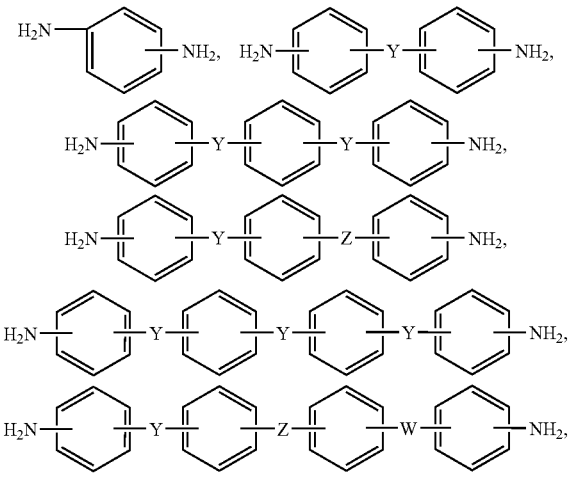

wherein Y, Z, and W are independently one or more of —CO—, —O—, —S—, —SO$_2$—, —CH$_2$—, —C(CH$_3$)$_2$— and —C(CF$_3$)$_2$—.

The solvent can be any solvent which can allow an aromatic tetracarboxylic dianhydride and an aromatic diamine to react therein while exerting no interference to the reaction between the aromatic tetracarboxylic dianhydride and the aromatic diamine. Preferably, the solvent makes the system homogeneous after reaction. That the solvent exerts no interference to the reaction between the aromatic tetracarboxylic dianhydride and the aromatic diamine refers to that the solvent substantially does not react with the aromatic tetracarboxylic dianhydride, the aromatic diamine, or their reaction products. The solvent suitable for the method can be one or more of dimethyl formamide, diethyl formamide, dimethyl acetylamide, diethyl acetylamide, dimethyl sulfoxide, dimethyl sulfone, N-methyl-2-pyrrolidone, N-cyclohexyl-2-pyrrolidone, trimethylurea, hexamethyl phosphoramide, diethyleneglycol dimethyl ether, pyridine, and methylpyridine; or a mixture of one or more of the aforementioned solvents and one or more of benzene, toluene, xylene, cyanobenzene, dioxane, ethyl acetate, 1-butanone, and 2-butanone. Preferably, the solvent can be one or more of dimethyl formamide, diethyl formamide, dimethyl acetylamide, diethyl acetylamide, dimethyl sulfoxide, dimethyl sulfone, N-methyl-2-pyrrolidone, N-cyclohexyl-2-pyrrolidone, trimethylurea, hexamethyl phosphoramide, diethyleneglycol dimethyl ether, pyridine, and methylpyridine. There is no special restriction on the amount of solvent added, as long as the aromatic tetracarboxylic dianhydride and the aromatic diamine are allowed to react in the solvent, i.e. at least one of the aromatic tetracarboxylic dianhydride and the aromatic diamine can be dissolved to form a solution to react. Larger quantity of the solvent is allowable. But as the solvent has to be evaporated to produce the polyimide materials when reaction finishes, larger quantity of the solvent will increase solvent consumption and the time required for evaporating the solvent, thus leading to higher production cost. Moreover, more solvent makes the solution over-diluted and thus leads to reduced reaction rate. According to one embodiment of the present disclosure, the solvent is usually added at an amount of about 2.5-50 times of the total weight of the coupling agent-containing filler, the aromatic tetracarboxylic dianhydride, the aromatic diamine, and the aliphatic dicarboxylic acid, and preferably about 5-20 times.

According to the method provided by the present disclosure, preferably, the aromatic tetracarboxylic dianhydride, the aromatic diamine, and the aliphatic dicarboxylic acid are respectively in a solution form thereof to mix and react with the corresponding other solutions. The concentrations of the solutions are independently about 5-50 wt %, preferably about 8-30 wt %.

The solvent for forming the aliphatic dicarboxylic acid solution is preferably mixed solvents of at least two of benzene, toluene, xylene, cyanobenzene, dioxane, ethyl acetate, 1-butanone, and 2-butanone. More preferably, mixed solvents of toluene/xylene and ethyl acetate. The volume ratio of mixed solvents is about 1:9-9:1, preferably about 1:3-3:1.

The temperatures for the reaction among the aromatic tetracarboxylic dianhydride, the aromatic diamine, and the coupling agent-containing filler and the contacting between the resulted polyamic acid and the aliphatic dicarboxylic acid can be any routine temperature for reaction of anhydride and amine, generally from about −20° C. to 99° C., preferably from about −10° C. to 50° C., and more preferably from about 20° C. to 40° C. IN other words, polyimide preparation through reaction of the aromatic tetracarboxylic dianhydride and the aromatic diamine can be carried out at ambient temperature, without requiring extra heating or cooling. The temperature for the contacting between the polyamic acid and the aliphatic dicarboxylic acid can be from about −20° C. to 90° C., and the time is about 0.1-24 hours. The imidization reaction temperature is about 250-450° C., and the time is about 0.1-10 hours.

An anhydride can react with an amine, or a carboxylic acid can react with an amine to produce an amic acid. The amic acid reacts under imidization condition to produce an imide. There is generally no need to carry out structure analysis for the obtained intermediate and final product. It can be deducted from the reactant raw materials and reaction conditions that the viscous solution intermediate is a polyamic acid solution, and the final product is a polyimide material. The polyimide film can be qualitatively characterized, for example, by IR spectrograph for verification purpose.

Polyimide materials in various forms can be obtained by the method provided by the present disclosure, such as polyimide films.

The present disclosure will be further described through the following examples.

Example 1

This example was carried out by dissolving 4,4'-oxydianiline (about 3.577 g) in dimethyl acetylamide solvent (about 100 mL). Nitrogen gas was introduced for protection. About 1.0 g (3-aminopropyl)triethoxysilane (KH550)-containing mica powder (provided by Shijiazhuang Haixing Mica powder Co. Ltd., particle diameter of about 2.6 microns, a weight ratio of the coupling agent and mica powder of about 5:95) was added. The solution was electrically stirred until the compounds were fully dissolved. About 3.896 g pyromellitic dianhydride was added into the solution in three times. The solution was stirred for the reaction to continue at about 35° C. for about 10 hours to produce a pale yellow viscous solution with an intrinsic viscosity of about 168 mL/g (testing condition: Ubbelodhe viscometer, constant temperature of 30° C., and the solution was diluted to a solid content of less than about 0.5% g/mL.). A toluene and ethyl acetate mixed solvent (volume ratio of 1:4, 10 mL) solution of about 0.830 g aliphatic dicarboxylic acid (of formula (II), in which $R^1$ is cyano, $R^2$ and $R^3$ are both methyl, R' and R'' are both methylene, m=15, and n=30, Noveon product), was added. The solution was stirred at about 35° C. for about 2 hours. The resulted solution was degassed to produce a polyamic acid. The polyamic acid was coated onto a clean smooth glass sheet, which was heated at about 180° C. in a drying oven for about 0.5 hours to remove the solvents, and then heated at about 400° C. for about 0.5 hours for imidization to produce a yellow transparent polyimide film with a thickness of about 20 microns.

Comparative Example 1

A polyamic acid solution was prepared as in example 1, except that no aliphatic dicarboxylic acid solution and coupling agent-containing filler were added. A pale yellow transparent polyimide film with a thickness of about 20 microns is obtained.

Example 2

This example was carried out by dissolving 4,4'-oxydianiline (about 3.577 g) in dimethyl acetylamide solvent (about 100 mL). Nitrogen gas was introduced for protection. About 1.5 g 3-methacryloxypropyltrimethoxysilane (A-187, KH560)-containing mica powder (provided by Shijiazhuang Haixing Mica powder Co. Ltd., particle diameter of about 2.6 microns, and a weight ratio of the coupling agent and mica powder of about 2:98) was added. The solution was electrically stirred until the compounds were fully dissolved. About 3.896 g pyromellitic dianhydride was added into the solution in three times. The solution was stirred for the reaction to continue at about 45° C. for about 10 hours to produce a pale yellow viscous solution with an intrinsic viscosity of about 196 mL/g (testing condition: Ubbelodhe viscometer, constant temperature of 30° C., and the solution was diluted to a solid content of less than about 0.5% g/mL.). A xylene and ethyl acetate mixed solvent (volume ratio of about 1:24, about 15 ml) solution of about 1.868 g aliphatic dicarboxylic acid (of formula (II), in which $R^1$ is cyano, $R^2$ and $R^3$ are both —H, R' and R'' are both methylene, m=20, and n=15, Noveon product) was added. The solution was stirred at about 35° C. for about 2 hours. The resulted solution was degassed to produce a polyamic acid. The polyamic acid was coated onto a clean smooth glass sheet, which was heated at about 180° C. in a drying oven for about 0.5 hour to remove the solvents, and then heated at about 400° C. for about 0.5 hour for imidization to produce a yellow transparent polyimide film with a thickness of about 20 microns.

Example 3

This example was carried out by dissolving 4,4'-oxydianiline (about 3.577 g) in diethyl formamide solvent (about 100 mL). Nitrogen gas was introduced for protection. About 2.0 g 3-glycidyloxypropyltrimethoxysilane (A-187, KH560)-containing alumina (provided by Zibo Aoda chemical Co. Ltd., particle diameter of about 2.6 microns, and a weight ratio of the coupling agent and alumina of about 4:96) was added. The solution was electrically stirred until the compounds were fully dissolved. About 3.896 g pyromellitic dianhydride was added into the solution in four times. The solution was stirred for the reaction to continue at about 40° C. for about 15 hours to produce a pale yellow viscous solution with an intrinsic viscosity of about 234 mL/g (testing condition: Ubbelodhe viscometer, constant temperature of 30° C., and the solution was diluted to a solid content of less than about 0.5% g/mL). A toluene and ethyl acetate mixed solvent (volume ratio of about 1:2, about 10 mL) of about 0.393 g aliphatic dicarboxylic acid (of formula (II), in which $R^1$ is cyano, $R^2$ and $R^3$ are both methyl, R' and R" are both methylene, m=28, and n=36, Noveon product) was added. The solution was stirred at about 45° C. for about 1.5 hours. The resulted solution was degassed to produce a polyamic acid. The polyamic acid was coated onto a clean smooth glass sheet, which was heated at about 180° C. in a drying oven for about 0.5 hour to remove the solvents, and then heated at about 400° C. for about 0.5 hour for imidization to produce a yellow transparent polyimide film with a thickness of about 20 microns.

Example 4

This example was carried out by dissolving diamino diphenyl methane (about 3.80 g) in dimethyl acetylamide solvent (about 100 mL). Nitrogen gas was introduced for protection. About 1.5 g (3-aminopropyl)triethoxysilane (KH550)-containing alumina (provided by Zibo Aoda chemical Co. Ltd., and has particle diameter of about 2.6 microns, and a weight ratio of the coupling agent and alumina of about 7:93) was added. The solution was electrically stirred until the compounds were fully dissolved. About 5.173 g biphenyltetracarboxylic dianhydride was added into the solution in several times. The solution was stirred for the reaction to continue at about 50° C. for about 5 hours to produce a pale yellow viscous solution with an intrinsic viscosity of about 168 mL/g (testing condition: Ubbelodhe viscometer, constant temperature of 30° C., and the solution was diluted to a solid content of less than about 0.5% g/mL). A xylene and ethyl acetate mixed solvent (volume ratio of about 1:2, about 10 mL) of about 0.830 g aliphatic dicarboxylic acid (of formula (II), in which $R^1$ is cyano, $R^2$ and $R^3$ are both methyl, R' and R" are both methylene, m=15, and n=30, Noveon product) was added. The solution was stirred at about 10° C. for about 4 hours. The resulted solution was degassed to produce a polyamic acid. The polyamic acid was coated onto a clean smooth glass sheet, which was heated at about 180° C. in a drying oven for about 0.5 hour to remove the solvents, and then heated at about 400° C. for about 0.5 hour for imidization to produce a yellow transparent polyimide film with a thickness of about 20 microns.

Example 5

This example was carried out by dissolving 4,4'-diaminobenzophenone (about 4.03 g) in mixed solvent of dimethyl acetylamide and dimethylformamide (volume ratio of about 1:1, 80 mL). Nitrogen gas was introduced for protection. About 1.5 g (3-aminopropyl) triethoxysilane (KH550)-containing inorganic clay (provided by Shijiazhuang Haixing Mica powder Co. Ltd, particle diameter of about 2.6 microns, and a weight ratio of the coupling agent and inorganic clay of about 1:99) was added. The solution was electrically stirred until the compounds were fully dissolved. About 4.287 g pyromellitic dianhydride was added into the solution in several times. The solution was stirred for the reaction to continue at about 15° C. for about 15 hours to produce a pale yellow viscous solution with an intrinsic viscosity of about 246 mL/g (testing condition: Ubbelodhe viscometer, constant temperature of 30° C., and the solution was diluted to a solid content of less than about 0.5% g/mL). A toluene and ethyl acetate mixed solvent (volume ratio of about 3:1, about 10 mL) solution of about 0.830 g aliphatic dicarboxylic acid (of formula (II), in which $R^1$ is cyano, $R^2$ is methyl, $R^3$ is H, R' and R" are both methylene, m=10, and n=10, Noveon product) was added. The solution was stirred at about 25° C. for about 5 hours. The resulted solution was degassed to produce a polyamic acid. The polyamic acid was coated onto a clean smooth glass sheet, which was heated at about 180° C. in a drying oven for about 0.5 hour to remove the solvents, and then heated at about 400° C. for about 0.5 hour for imidization to produce a yellow transparent polyimide film with a thickness of about 20 microns.

Example 6

This example was carried out by dissolving 4,4'-oxydianiline (about 3.577 g) in dimethyl acetylamide solvent (about 100 mL). Nitrogen gas was introduced for protection. About 1.5 g vinyltriethoxysilane (A151)-containing mica powder (provided by Shijiazhuang Haixing Mica powder Co. Ltd, particle diameter of about 12 microns, and a weight ratio of the coupling agent and inorganic clay of about 5:95) was added. The solution was electrically stirred until the compounds were fully dissolved. About 5.251 g Biphenyltetracarboxylic dianhydride was added into the solution in several times. The solution was stirred for the reaction to continue at about 15° C. for about 16 hours to produce a pale yellow viscous solution with an intrinsic viscosity of about 276 mL/g (testing condition: Ubbelodhe viscometer, constant temperature of 30° C., and the solution was diluted to a solid content of less than about 0.5% g/mL). A xylene and ethyl acetate mixed solvent (volume ratio of about 2:1, about 15 ml) of solution of about 0.830 g aliphatic dicarboxylic acid (of formula (II), in which $R^1$ is cyano, $R^2$ and $R^3$ are both methyl, R' and R" are both methylene, m=15, and n=30, Noveon product) was added. The solution was stirred at about 35° C. for about 2 hours. The resulted solution was degassed to produce a polyamic acid. The polyamic acid was coated onto a clean smooth glass sheet, which was heated at 180° C. in a drying oven for about 0.5 hour to remove the solvents, and then heated at about 400° C. for about 0.5 hour for imidization to produce a yellow transparent polyimide film with a thickness of about 20 microns.

Performance Test

Peel strength of the polyimide films prepared in examples 1-6 and comparative example 1 were respectively tested according to ASTM D 903, and the results are shown in Table 1.

Glass transition temperature of the polyimide films prepared in examples 1-6 and comparative example 1 were respectively tested according to GB/T19466, and the results are shown in Table 1.

Thermal expansion coefficient of the polyimide films prepared in examples 1-6 and comparative example 1 were respectively tested according to ASTM D 696, and the results are shown in Table 1.

Elongation at break of the polyimide films prepared in examples 1-6 and comparative example 1 were respectively tested according to ASTM D 882, and the results are shown in Table 1.

Tensile strength of the polyimide films prepared in examples 1-6 and comparative example 1 were respectively tested according to ASTM D 882, and the results are shown in Table 1.

TABLE 1

| Polyimide material source | Peel strength (N/cm) | Tensile strength (MPa) | Elongation at break (%) | Glass transition temperature (° C.) | Thermal expansion coefficient (ppm/° C.) |
|---|---|---|---|---|---|
| Example 1 | 17.3 | 170 | 60 | 453 | 26 |
| C. E. 1 | 8.3 | 110 | 47 | 476 | 25 |
| Example 2 | 15.6 | 158 | 57 | 472 | 28 |
| Example 3 | 16.8 | 179 | 53 | 467 | 29 |
| Example 4 | 15.4 | 181 | 47 | 456 | 27 |
| Example 5 | 13.2 | 167 | 45 | 463 | 26 |
| Example 6 | 17.5 | 172 | 40 | 482 | 28 |

It can be seen from the results shown in Table 1 that compared with available polyimide films, the polyimide films provided by the present disclosure has good mechanical properties, outstanding peel strength, and high glass transition temperature.

Many modifications and other embodiments of the present disclosure will come to mind to one skilled in the art to which the present disclosure pertains having the benefit of the teachings presented in the foregoing description; and it will be apparent to those skilled in the art that variations and modifications of the present disclosure can be made without departing from the scope or spirit of the present disclosure. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A polyimide material comprising:
a polyimide, which has repeating units of formula (I):

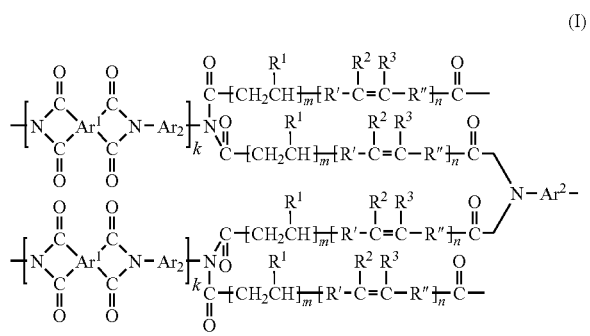

(I)

wherein $Ar^1$ and $Ar^2$ are each independently an aryl containing at least one benzene ring, the value of k allows the intrinsic viscosity of a polyamic acid corresponding to the polyimide to be about 100-300 mL/g, $R^1$, $R^2$ and $R^3$ are independently one or more of —H, alkyl, carboxyl, cyano, amino, and alkylamino, R' and R" are independently alkylene or alkylidene, each m is independently an integer of about 0-64, each n is independently an integer of about 0-45, provided that m+n>0; and a coupling agent-containing filler.

2. The polyimide material according to claim 1, wherein based on the total weight of the polyimide material, the content of the coupling agent-containing filler is about 0.1-40 wt %, and the content of the polyimide is about 60-99.9%.

3. The polyimide material according to claim 1, wherein the $Ar^1$ is one or more of groups with the following structures:

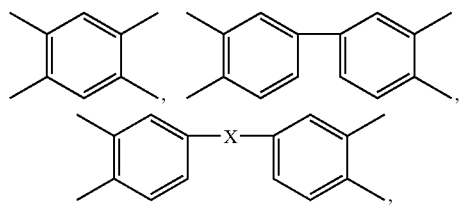

wherein X is selected from the following divalent groups: —CO—, —O—, —S—, —SO$_2$—, —CH$_2$—, —C(CH$_3$)$_2$— and —C(CF$_3$)$_2$—.

4. The polyimide material according to claim 1, wherein $Ar^2$ is one or more of groups with the following structures:

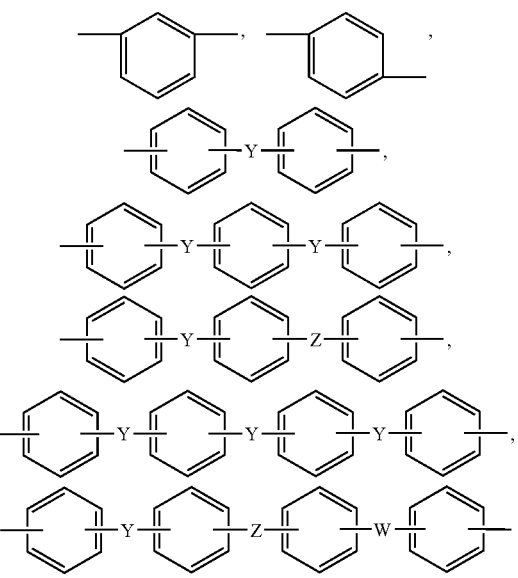

wherein Y, Z, and W are independently one or more of —CO—, —O—, —S—, —SO$_2$—, —CH$_2$—, —C(CH$_3$)$_2$— and —C(CF$_3$)$_2$—.

5. The polyimide material according to claim 1, wherein $R^1$, $R^2$ and $R^3$ are independently selected from the group consisting of —H, —CN, —CH$_3$, —CH(CH$_3$)$_2$, —COOH, and —N(CH$_3$)$_2$.

6. The polyimide material according to claim 1, wherein R' and R" are independently —CH$_2$— or —C$_2$H$_4$—.

7. The polyimide material according to claim 1, wherein each m is independently an integer of about 5-30, each n is independently an integer of about 5-40.

8. The polyimide material according to claim 1, wherein the value of k allows the intrinsic viscosity of the polyamic acid corresponding to the polyimide to be about 140-260 mL/g.

9. The polyimide material according to claim 1, wherein the coupling agent-containing filler is one or more selected from the group consisting of a coupling agent-containing mica powder, a coupling agent-containing inorganic clay, and a coupling agent-containing alumina.

10. The polyimide material according to claim 1, wherein the content of the coupling agent in the coupling agent-containing filler is about 0.5-8 wt %.

11. The polyimide material according to claim 9, wherein the coupling agent is one or more selected from the group consisting of (3-aminopropyl)triethoxysilane, (3-glycidoxyoxypropyl)trimethoxysilane, (3-chloropropyl)trimethoxysilane, 3-methacryloxypropyltrimethoxysilane, vinyltriethoxysilane, vinyltrimethoxysilane, isopropyl tri(N-ethylaminoethylamino)titanate, and isopropyl tri(dioctylpyrophosphate) titanate.

12. The polyimide material according to claim 1, wherein the particle diameter of the coupling agent-containing filler is no more than about 15 microns.

13. A method for preparing a polyimide material, the method comprising:

allowing a mixture comprising an aromatic tetracarboxylic dianhydride, an aromatic diamine, and a coupling agent-containing filler to react to produce a polyamic acid;

contacting the polyamic acid with an aliphatic dicarboxylic acid of formula (II) to produce an intermediate:

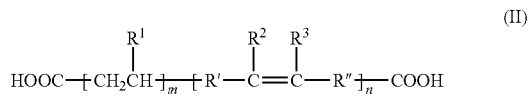
(II)

wherein $R^1$, $R^2$ and $R^3$ are independently one or more of —H, alkyl, carboxyl, cyano, amino, or alkylamino, R' and R" are independently alkylene or alkylidene, each m is independently an integer of about 0-64, each n is independently an integer of about 0-45, provided that m+n>0; and the intrinsic viscosity of the polyamic acid is about 100-300 mL/g; and imidizing the intermediate to produce the polyimide material;

wherein the polyimide material comprises a polyimide which has repeating units of formula (I):

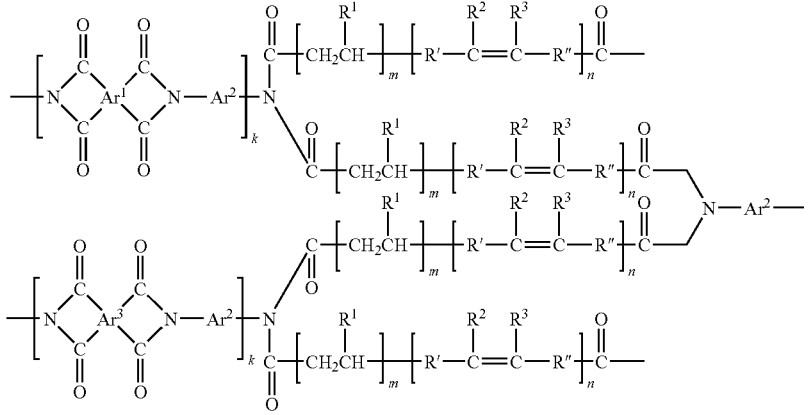

wherein $Ar^1$ and $Ar^2$ are each independently an aryl containing at least one benzene ring, the value of k allows the intrinsic viscosity of a polyamic acid corresponding to the polyimide to be about 100-300 mL/g, $R^1$, $R^2$ and $R^3$ are independently one or more of —H, alkyl, carboxyl, cyano, amino, or alkylamino, R' and R" are independently alkylene or alkylidene, each m is independently an integer of about 0-64, each n is independently an integer of about 0-45, provided that m+n>0; and a coupling agent-containing filler.

14. The method according to claim 13, wherein the mixture reacts in a solvent.

15. The method according to claim 13, wherein based on the total weight of the aromatic tetracarboxylic dianhydride, the aromatic diamine, the coupling agent-containing filler, and the aliphatic dicarboxylic acid, the coupling agent-containing filler is added at an amount of about 0.1-40 wt %, the polyamic acid is added at an amount of about 60-99 wt %, the aliphatic dicarboxylic acid is added at an amount of about 0.1-20 wt %.

16. The method according to claim 13, wherein the molar ratio of the aromatic tetracarboxylic dianhydride and the aromatic diamine is about 0.8-1.2:1.

17. The method according to claim 14, wherein the amount of the solvent is about 2.5-50 times of the total weight of the coupling agent-containing filler, the aromatic tetracarboxylic dianhydride, the aromatic diamine, and the aliphatic dicarboxylic acid.

18. The method according to claim 13, wherein $R^1$, $R^2$ and $R^3$ are independently one or more of —H, —CN, —$CH_3$, —$CH(CH_3)_2$, —COOH, —$N(CH_3)_2$.

19. The method according to claim 13, wherein R' and R" are independently —$CH_2$— or —$C_2H_4$—.

20. The method according to claim 13, wherein m is an integer of about 5-30, and n is an integer of about 5-40.

21. The method according to claim 13, wherein the intrinsic viscosity of the polyamic acid is about 140-260 mL/g.

22. The method according to claim 13, wherein the aromatic tetracarboxylic dianhydride is one or more of the following aromatic tetracarboxylic dianhydrides:

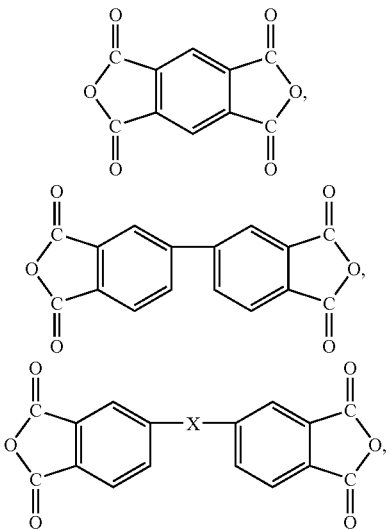

wherein X is selected from of the following divalent groups: —CO—, —O—, —S—, —SO$_2$—, —CH$_2$—, —C(CH$_3$)$_2$— and —C(CF$_3$)$_2$—.

23. The method according to claim 13, wherein the aromatic diamine is one or more of following aromatic diamines:

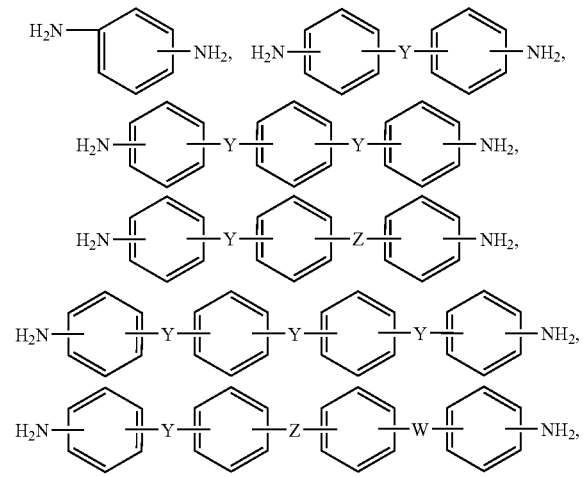

wherein Y, Z, and W are independently one or more of —CO—, —O—, —S—, —SO$_2$—, —CH$_2$—, —C(CH$_3$)$_2$— and —C(CF$_3$)$_2$—.

24. The method according to claim 14, wherein the solvent is one or more of dimethyl formamide, diethyl formamide, dimethyl acetylamide, diethyl acetylamide, dimethyl sulfoxide, dimethyl sulfone, N-methyl-2-pyrrolidone, N-cyclohexyl-2-pyrrolidone, trimethylurea, hexamethyl phosphoramide, diethyleneglycol dimethyl ether, pyridine, and methylpyridine.

25. The method according to claim 13, wherein the coupling agent-containing filler is one or more selected from the group consisting of a coupling agent-containing mica powder, a coupling agent-containing inorganic clay, and a coupling agent-containing alumina.

26. The method according to claim 13, wherein the content of the coupling agent in the coupling agent-containing filler is about 0.5-8 wt %.

27. The method according to claim 25, wherein the coupling agent is one or more selected from the group consisting of (3-aminopropyl)triethoxysilane, (3-methacryloxypropyl)trimethoxysilane, (3-chloropropyl)trimethoxysilane, 3-glycidyloxypropyltrimethoxysilane, vinyltriethoxysilane, vinyltrimethoxysilane, isopropyl tri(N-ethylamino-ethylamino) titanate and isopropyl tri(dioctylpyrophosphate) titanate.

28. The method according to claim 13, wherein the particle diameter of the coupling agent-containing filler is no more than about 15 microns.

29. The method according to claim 13, wherein for the reaction among the aromatic tetracarboxylic dianhydride, the aromatic diamine, and the coupling agent-containing filler, the temperature is from about −20° C. to 90° C., and the reaction time is about 0.1-24 hours.

30. The method according to claim 13, wherein for the contacting between the polyamic acid and the aliphatic dicarboxylic acid, the temperature is from about −20° C. to 90° C., and the reaction time is about 0.1-24 hours.

31. The method according to claim 13, wherein the imidizing temperature is about 250° C.-450° C., and the imidizing time is about 0.1-10 hours.

32. A polyimide material prepared according to the method of claim 13.

33. A device comprising the polyimide material of claim 1.

34. The device according to claim 33, which is a mobile phone module.

35. The device according to claim 33, which is an automobile part.

36. A polyimide comprises repeating units of formula (I):

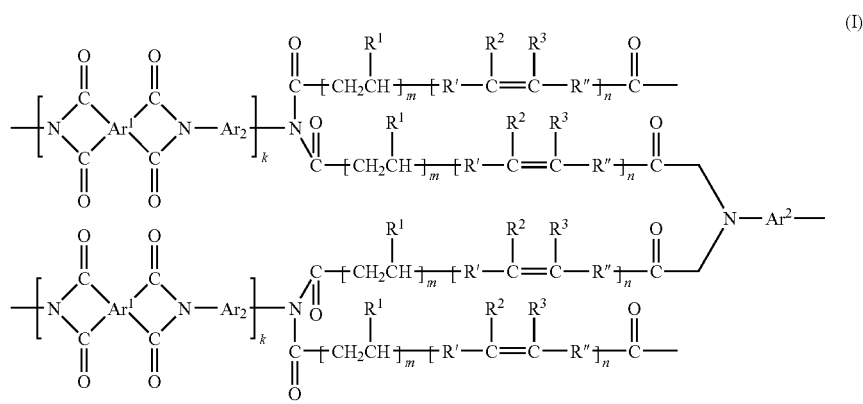

wherein $Ar^1$ and $Ar^2$ are each independently an aryl containing at least one benzene ring, the value of k allows the intrinsic viscosity of a polyamic acid corresponding to the polyimide to be about 100-300 mL/g, $R^1$, $R^2$ and $R^3$ are independently one or more of —H, alkyl, carboxyl, cyano, amino, and alkylamino, R' and R" are independently alkylene or alkylidene, each m is independently an integer of about 0-64, each n is independently an integer of about 0-45, provided that m+n>0.

* * * * *